US012783975B1

(12) United States Patent
Malhotra et al.

(10) Patent No.: US 12,783,975 B1
(45) Date of Patent: Nov. 3, 2026

(54) SKILLS PROFICIENCY SCORING USING WEIGHT PREDICTION AND REINFORCEMENT LEARNING

(71) Applicant: TrueBlue, Inc, Tacoma, WA (US)

(72) Inventors: Jatin Malhotra, Quebec (CA); Matthew Wolfe, Littleton, NH (US)

(73) Assignee: TRUEBLUE, INC., Tacoma, WA (US)

( * ) Notice: Subject to any disclaimer, the term of this patent is extended or adjusted under 35 U.S.C. 154(b) by 0 days.

(21) Appl. No.: 19/043,459

(22) Filed: Feb. 1, 2025

(51) Int. Cl.
*G06Q 10/0631* (2023.01)
*G06Q 10/0639* (2023.01)

(52) U.S. Cl.
CPC ................ *G06Q 10/063118* (2013.01); *G06Q 10/063112* (2013.01); *G06Q 10/06393* (2013.01)

(58) Field of Classification Search
None
See application file for complete search history.

(56) References Cited

U.S. PATENT DOCUMENTS

2011/0258015 A1* 10/2011 Garrigan ............ G06Q 10/1053 705/321
2020/0411170 A1* 12/2020 Brown ................... G06N 20/00
2021/0344800 A1* 11/2021 Shwartz .............. H04M 3/5175
2021/0383261 A1* 12/2021 Hanna ....................... G06N 5/04
2022/0108114 A1* 4/2022 Yoshida ..................... G06T 7/73
2022/0114532 A1* 4/2022 Virnoche ....... G06Q 10/063112
2024/0159413 A1* 5/2024 Kim ......................... F24F 11/64
2024/0168980 A1* 5/2024 Kobayakawa .......... G06F 16/34
2024/0378950 A1* 11/2024 Latifi .................. G09B 21/007

OTHER PUBLICATIONS

Yangyang Guo, Hao Wang, Lei He, Witold Pedrycz, P. N. Suganthan, Yanjie Song, "A Reinforcement Learning-assisted Genetic Programming Algorithm for Team Formation Problem Considering Person-Job Matching", https://doi.org/10.48550/arXiv.2304.04022 (Year: 2023).*

* cited by examiner

*Primary Examiner* — Mehmet Yesildag
(74) *Attorney, Agent, or Firm* — Evolve Patent Law Group, PLLC.

(57) ABSTRACT

Systems and methods described include a skill scoring system that quantifies the gap between demand and supply and rates the level of expertise for each skill. A neural network including an attention mechanism may output an initial set of demand weights for a demand equation and an initial set of supply weights for a supply equation, wherein the information related to worker demand and worker supply include factors for demand and supply of a skill that are extracted using an ensemble of LLMs. The initial set of demand and supply weights are further refined using a reinforcement learning (RL) agent.

15 Claims, 9 Drawing Sheets

301

$$P_{final}(skill) = \frac{w_A \cdot P_A(skill) + w_B \cdot P_B(skill) + w_C \cdot P_C(skill)}{w_A + w_B + w_C}$$

Where:

- $w_A$, $w_B$, and $w_C$ are the weights representing the reliability or specialization of each LLM.
- $P_A(skill)$, $P_B(skill)$, $P_C(skill)$ are the confidence scores that each LLM assigns to the specific skill.

FIG. 3

SKILLS PROFICIENCY SCORING USING WEIGHT PREDICTION AND REINFORCEMENT LEARNING

TECHNICAL FIELD

This disclosure relates generally to artificial intelligence, and in particular to large language models (LLMs).

BACKGROUND INFORMATION

Neural networks are computational models inspired by the brain, having interconnected nodes ("neurons") organized in layers. They learn complex patterns from data by adjusting the weights of connections between neurons during training. For Large Language Models (LLMs), specific architectures may be preferred. Recurrent Neural Networks (RNNs), especially variants like Long Short-Term Memory (LSTM) and Gated Recurrent Unit (GRU) networks, are popular for their ability to process sequential data, a key requirement for language. Transformer networks have become a dominant architecture for LLMs.

Large Language Models (LLMs) can analyze text by using deep neural networks trained on extensive and diverse datasets to understand linguistic patterns and contextual nuances. They process input text through multiple transformer layers, enabling the model to identify and extract relevant features that determine the appropriate category for each piece of text, such as sentiment, topic, or intent. Their ability to process and synthesize large datasets allows them to uncover patterns and insights that would be impractical for humans to detect manually.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 is a weighted voting formula, associated with FIG. 1 and FIG. 2, in accordance with embodiments of the disclosure.

DETAILED DESCRIPTION

Figure 1:
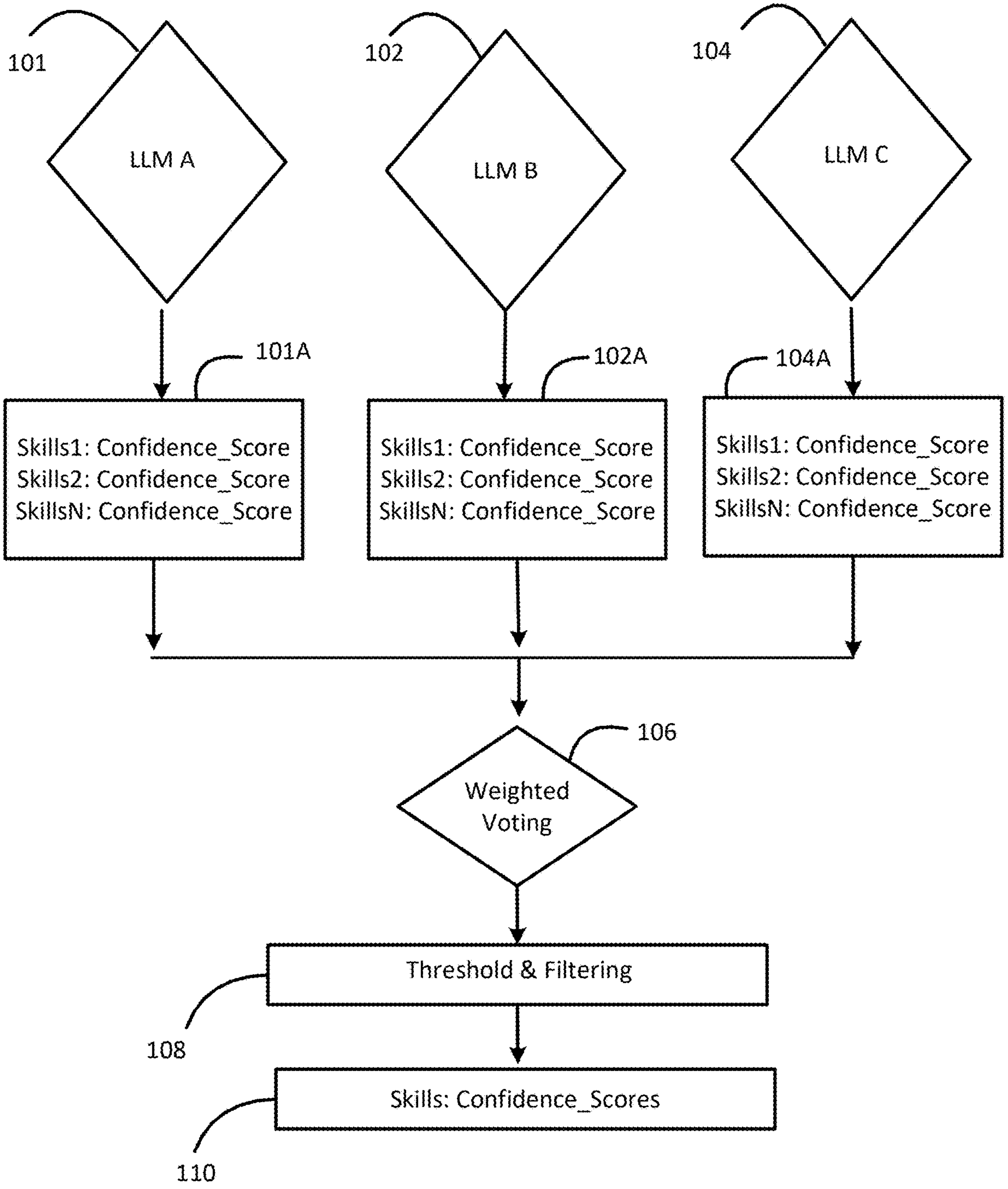
FIG. 1 illustrates a process flow, in accordance with embodiments of the disclosure.

Artificial Intelligence (AI) is under-utilized in the staffing industry. Efficient deployment of large numbers of workers to jobs (e.g., 70,000-100,000 per day), especially temporary or gig workers, requires radically improved analysis to deploy workers for a particular task or job. In the staffing industry, employers often face the challenge of accurately assessing the skills and proficiency levels of available workers and matching them to job opportunities. This challenge is compounded by the dynamic nature of the industry, where demand for specific skills can vary significantly over time. Employers need a more efficient and accurate way to identify workers with the right skills and expertise to meet their immediate and future needs.

Currently, skill assessment and workforce planning rely on manual resume evaluation, subjective interviews, and skills testing. Oftentimes, it is not clear what skill the employer is actually requesting. Nor is it clear which skill a worker can actually offer. Current manual methods are time-consuming, limited in scope, and lack proactive workforce planning capabilities. Embodiments described below include advanced LLM ensemble methods to assist in automation of skill assessment, as well as improve accuracy to enable employers to proactively plan for future skill demands. The methods and systems utilizing LLM's eliminate manual and subjective practices, offering an efficient and data-driven solution. In embodiments, once skills are extracted, the skills are used in a skill proficiency scoring system to quantify the gap between demand and supply as well as rating the level of expertise for each skill. This can help employers make more informed decisions and better match workers to jobs.

Once a skill is extracted or inferred from data as valid, the below described platform or architecture combines attention mechanisms to dynamically weight input features and reinforcement learning to predict the optimal weights for the demand and supply scores for the extracted skill. In embodiments, the goal is to predict weights for the demand and supply factors (such as the frequency of mention, worker reliability, etc.) that adapt to changing data and improve prediction accuracy over time, In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A) B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

These and other embodiments are described in detail below with respect to FIGS. 1-9.

FIG. 1 illustrates an example process for inferring a skill using ensemble LLM systems and methods, in accordance with embodiments. FIG. 1 illustrates Large Language Model A ("LLM-A") 101, Large Language Model B ("LLM B") 102, Large Language Model C ("LLM-C") 104. In the example, LLM-A 101 generates an output 101A, LLM-B 102 generates an output 102A, and LLM-C 104 generates an output 104A. Independent outputs 101A, 102A, and 104A include skills (e.g., skills 1, 2 . . . . N) and corresponding confidence scores. In embodiments, the outputs are provided to Weighted Voting block 106.

In various embodiments, LLM-A 101 focuses on syntactic parsing and structured data extraction (e.g., identifying skill keywords or phrases). In examples, LLM-A 101 utilizes part-of-speech tagging, named entity recognition, and dependency parsing to identify relevant skills. In contrast, LLM-B 102 may focus on semantic understanding (e.g., interpreting the context and meaning behind job descriptions or customer feedback).

LLM models are designed to perform various natural language processing tasks and are characterized by their number of parameters, with different versions ranging from smaller to larger sizes to cater to different computational needs and applications. In examples, LLM-A 101 is a relatively smaller model than LLM-B 102 because syntactic parsing may be less complex than semantic understanding that requires interpretation of contextual cues. For example, LLM-A 101 may include LLAMA-13B™, a variant of LLAMA™ model series having approximately 13 billion parameters. In contrast, the larger LLAMA-30B™, having approximately 30 billion parameters may be more appropriate for LLM-B 102.

In embodiments, LLM-C is a fine-tuned model for domain specific language. In embodiments, the domain is the staffing industry, e.g., temporary staffing industry or light industrial temporary staffing industry. In examples a larger model may be more appropriate for LLM-C, e.g., LLAMA-30B™. In embodiments, each LLM is prompt engineered to extract as many skills as possible with skill confidence scores ranging from, e.g., 0-1.

As will be discussed in more detail with respect to FIG. 2 and FIG. 3, at weighted voting block 106, the outputs 101A, 102A, and 104A may be combined. At block 108, thresholding and filtering is applied to the output of weighted voting block 106 to determine a final set of extracted skills at block 110.

Figure 2:
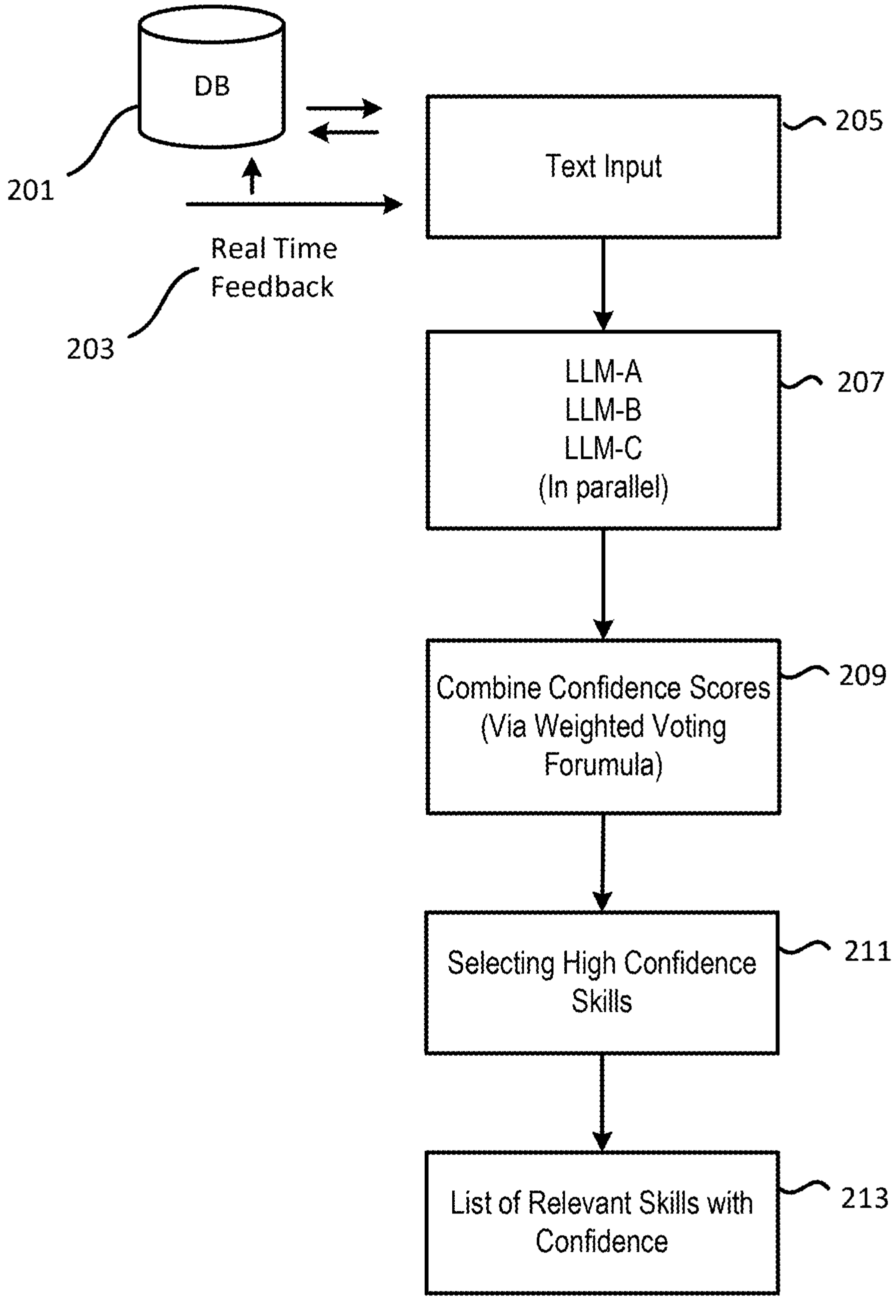
FIG. 2 illustrates a flow chart, in accordance with embodiments of the disclosure.

Referring now to FIG. 2, which is a flow chart 200 associated with FIG. 1, in accordance with embodiments. Database 201 may include job orders or data related to job orders such as, but not limited to, customer notes, comments including evaluations of workers/work performed at previous jobs/shifts, and prior job descriptions. In some embodiments (not shown), video from jobsites of relevant job orders can be translated by AI processing into text descriptions of work being performed on the jobsite. Real-time feedback 203 may include on-the-job feedback by customers at worksites or from monitoring worksites. In FIG. 2, both database 201 and real time feedback 203 are provided to Text Input block 205. Next, the text is provided to LLM-A LLM-B, and LLM-C for ensemble LLM processing (e.g., to perform respective syntactic parsing, semantic understanding, and processing via a domain-specific model) at 207. In embodiments, each LLM will determine specific extracted keywords (skills) and corresponding confidence scores.

The confidence scores determined by LLM-A LLM-B, and LLM-C may be represented by, respectively, $P_A$ (skill), $P_B$ (skill), and $P_C$ (skill). An example of a weighted voting formula to combine the confidence scores for each skill extracted by the different LLMs is shown in FIG. 3. Note that $W_A$, $W_B$ and $W_C$ are the weights that may represent the reliability (accuracy) or specialization of each LLM. In some embodiments, if a skill is extracted by one LLM but not another, a skill competent score of 0 may be assigned for the LLM missing the skill.

For example, to extract the skill "forklift operation" from a job description, the LLMs may assign the following confidence scores:

LLM-A (syntactic parsing): $P_A$ ("forklift operation")=0.8

LLM-B (semantic understanding): $P_B$ ("forklift operation")=0.6

LLM-C (domain-specific language): ("forklift operation")=0.9

And, e.g., the weights $W_A$, $W_B$ and $W_C$, are:

$W_A$=0.4

$W_B$=0.3

$W_C$=0.3

The final confidence score for "forklift operation" is then:

$$P_{final}(\text{"forklift operation"}) = \frac{0.4*0.8+0.3*0.6+0.3*0.9}{0.4+0.3+0.3} = 0.77$$

In embodiments, if the threshold is 0.6, "forklift operation" will be extracted as a valid skill.

Figure 4:
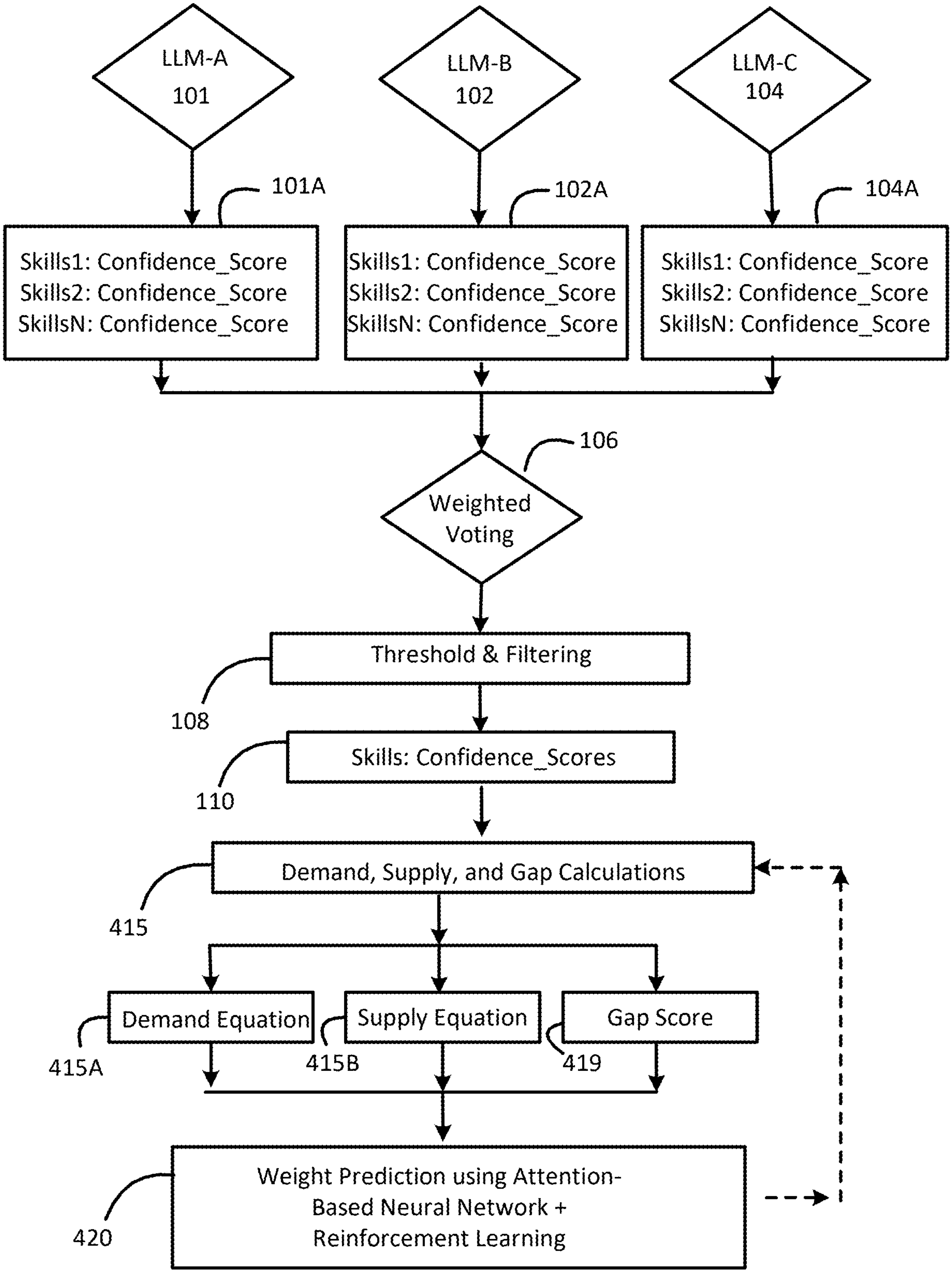
FIG. 4 is a process flow related to integrating the process flow of FIG. 1 with weight prediction, in accordance with embodiments of the disclosure.

FIG. 4 illustrates an example process for calculating a gap score between demand and supply, in accordance with embodiments. In embodiments, a proficiency scoring system quantifies the gap between demand and supply and rates the level of expertise for each skill. In embodiments, blocks 101-110 are similar to blocks 101-110 of FIG. 1 and for the sake of brevity, their description is not repeated here. In embodiments, after skills have been extracted at block 110, Demand, Supply and Gap scores are calculated for a skill at block 415. As part of the calculation, at a block 415A, a demand score for the extracted skill is calculated using various demand factors:

Demand Factors:

1. Frequency of Mention (FM): This is a measure of how often a skill is mentioned in job orders and market research reports.

FM=(Number of skill mentions in legacy or database job orders+Number of skill mentions in market research reports)/(Total number of legacy or database job orders+jobs used market research reports)

FM is normalized in the range of 0-1 using Min Max Normalization Technique

FM=(FM−FM_min)/(FM_max−FM_min)

2. Job Order Complexity (JOC): This is a measure of how complex job orders are, taking into account factors such safety requirements, duration of a shift.

JOC=(Number of Job Orders with Safety feature enabled×Number of additional equipment types such as Gloves, helmets needed for A job)+(Average time required to complete a job for a respective skill/Average time required to complete a job for all skills)*(1−MIN (0.9, skill match between worker and job requirements))

JOC is normalized in the range of 0-1 using Min Max Normalization Technique

MIN ((0.9, skill match between worker and job requirements)): This term introduces a penalty for mismatched worker skills and job requirements. The MIN function ensures that the penalty is capped at 10% (1-0.9), even if there's a perfect match. This means that having exactly matching worker skills will result in a maximum reduction of complexity, but it won't reach zero 3. Industry Growth Rate (IGR): This is a measure of the projected growth rate of an industry requiring the skill.

IGR=(Staffing Company Projected revenue/Staffing Company Current revenue)+External Industry Growth Rate)/2)×(Number of skilled workers required for the industry in Staffing Company Database/Total number of workers available in the industry in Staffing Company Database)'

IGR is normalized in the range of 0-1 using Min Max Normalization Technique

4. Economic Importance Score (EIS): This represents the criticality of a skill to the industry's economic health.

EIS=(Industry growth rate×Job order complexity)+(Number of skilled workers required for the industry in Staffing Company Database/Total number of workers available in the industry in Staffing Company Database)

EIS is normalized in the range of 0-1 using Min Max Normalization Technique

In embodiments, the demand factors are used in a demand score equation ("demand equation") or algorithm.

Demand Score Calculation:

Demand Score (DS)=w1*Frequency of Mention+w2*Economic Importance Score+w3*Job Order Complexity+w4*Industry Growth Rate Weighted variables: w1=(Weight prediction model); w2=(Weight prediction model; w3=(Weight prediction model); w4=(Weight prediction model)

Figure 5:
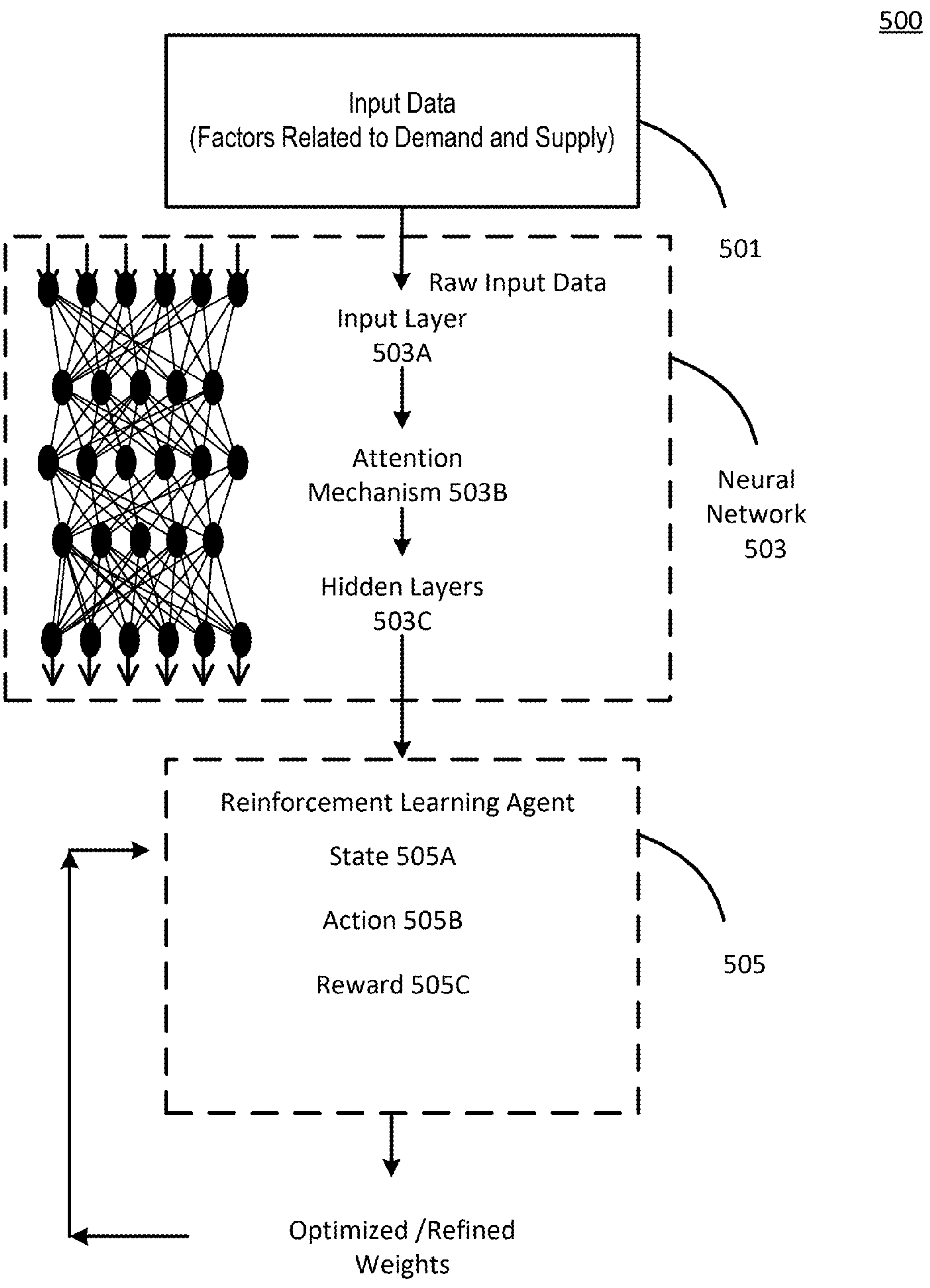
FIG. 5 illustrates a process related to the weight prediction of FIG. 4, in accordance with embodiments of the disclosure.
Figure 6:
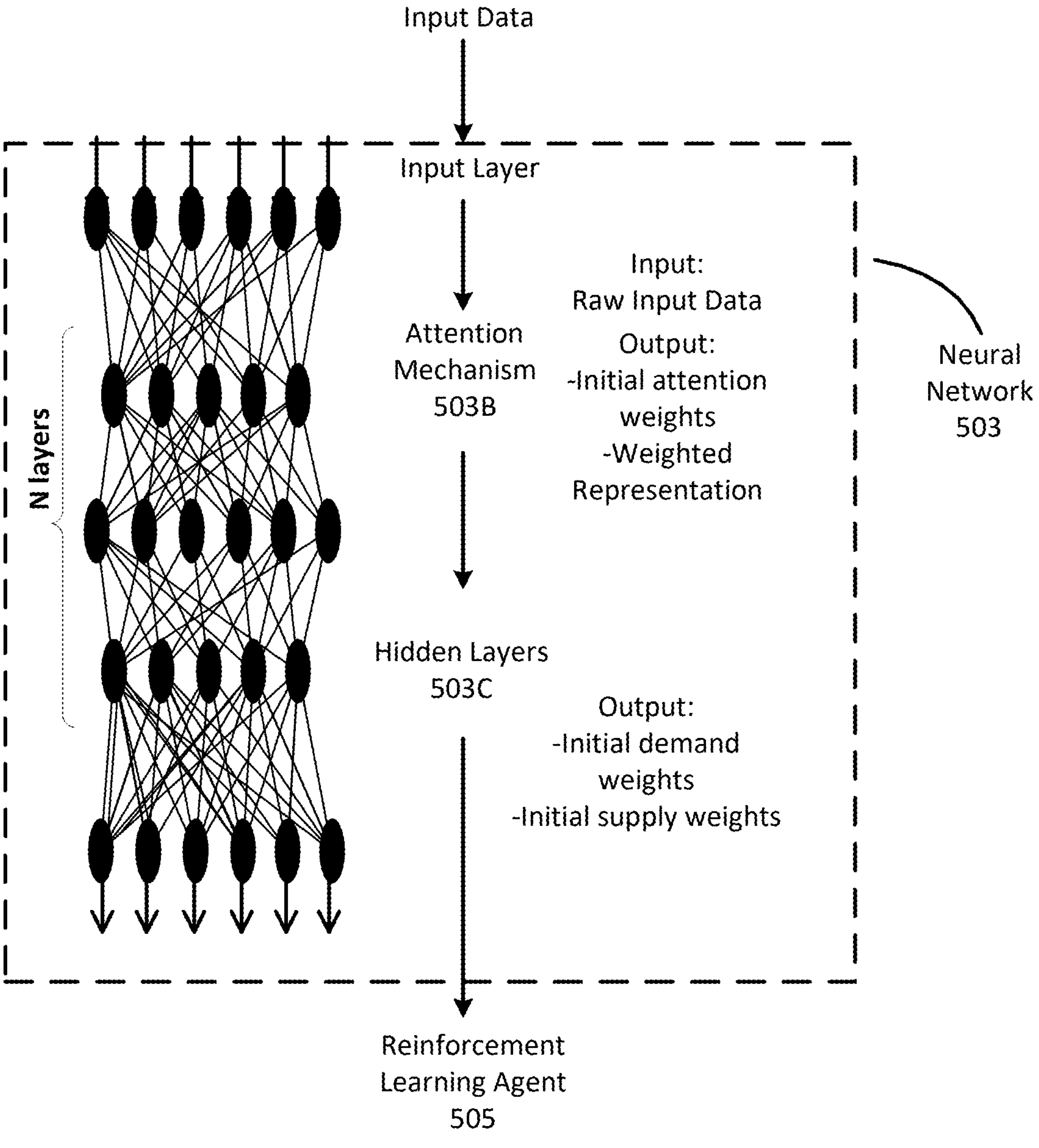
FIG. 6 illustrates a portion of FIG. 5 in more detail, in accordance with embodiments of the disclosure.
Figure 7:
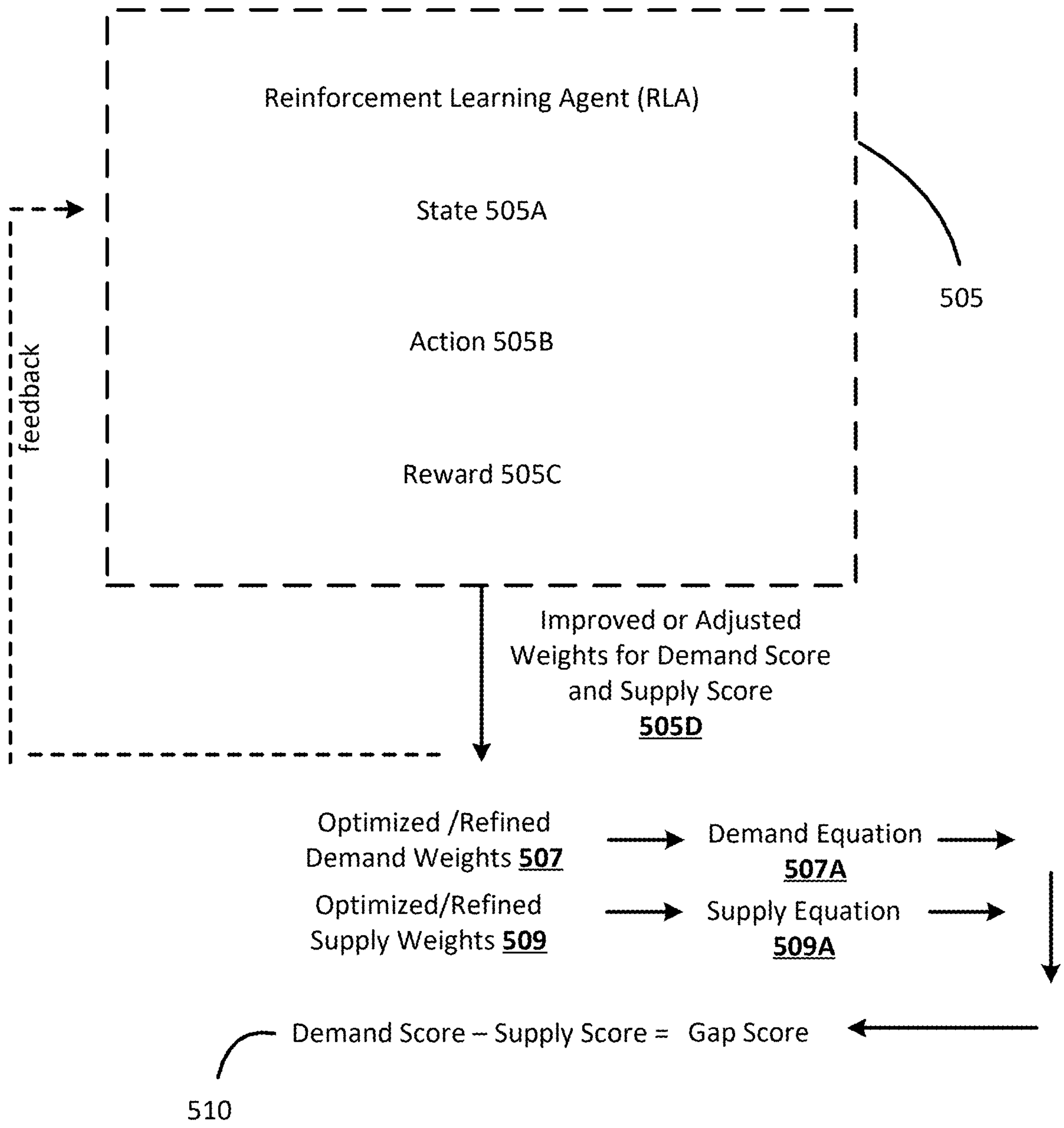
FIG. 7 illustrates another portion of FIG. 5 in more detail, in accordance with embodiments of the disclosure.

In embodiments, the weighted variables are calculated via weight prediction models that will be further discussed in FIGS. 5-7.

At a block 415B, a supply score is calculated. In embodiments, supply factors that may be used in the supply equation/algorithm are summarized below:

Supply Factors:

1. Number of Skilled Workers (NSW): This is a measure of how many workers have the required skill.

NSW=(Number of active certified workers in the skill + Number of active workers containing the skill+ Number of active workers worked in the skill)/Total number of active workers 2. Worker Reliability Score (WR): This represents the worker reliability score for each skill.

WR=Number of Successful job completions/Number of job dispatches

3. Worker Turnover Rate (WTR): This represents the rate at which skilled workers are leaving their jobs.

WTR=(Number of inactive workers/Total number of skilled workers)× (Average days required to replace a worker).

4. Worker Engagement Level (WEL):

WEL=Number of workers responses to a job message/number of job messages+Average worker Rating in the skill/Average Rating in all skills 5. Training Program Availability (TPA): This is a measure of how many training programs are available for workers to acquire the required skills.

TPA=(Number of training programs+Number of online courses+Number of workshops)/Total number of skilled workers.

All above supply factors may be normalized in the range of 0-1 using M in Max Normalization Technique.

In embodiments, the supply factors are then used in a supply score equation.

Supply Score Calculation:

Supply Score (SS)=w5*Number of Skilled Workers+w6*Worker Reliability Score−w7*Worker Turnover Rate+w8*Worker Engagement Level+w9*Training Program Availability Weighted variables:

w5=(Weight prediction model)

w6=(Weight prediction model)

w7=(Weight prediction model) (negative weight to indicate a decrease in supply)

w8=(Weight prediction model)

w9=(Weight prediction model)

Once the supply scores and the demand scores are calculated, a gap score is calculated at 419.

Gap Score Calculation:

Gap Score (GS)=Demand Score-Supply Score

For a simple scoring calculation example:

Skill: Truck Diesel Mechanic (extracted above in FIG. 1 using Ensemble LLMs)

Demand Score: 4

Supply Score: 3

Gap Score: Demand (4)−Supply (3)=1

At a block 420, weight prediction ("weight prediction model") using attention-based neural network plus reinforcement learning is performed to refine the weights that are used above in the demand, supply, and gap calculations of 415, 415A and 415B.

FIG. 5 illustrates a process 500 that illustrates the prediction of weights associated with block 420 of FIG. 4, in accordance with embodiments, The process begins with input data block 501, which includes factors (also features) related to both worker demand and worker supply (FIG. 4) for an extracted skill. Input data 501 is fed into a neural network 503 which comprises an input layer 503A that receives the data, an attention mechanism 503B that assigns initial weights to the input factors based on their relative importance and generates a weighted representation of the input factors, and one or more hidden layers 503C that further processes this weighted data. The output of neural network 503, in the form of initial demand and supply weights, is then passed to a reinforcement learning (RL) agent 505. RL agent 505 may operate based on a defined state (initial weights and weighted input data), take action 505 (adjustments to the weights), receive a reward 505C, and produce an output (adjusted weights).

FIG. 6 illustrates neural network 503 of FIG. 5 in more detail, in accordance with embodiments. As noted above, attention mechanism 503B allows the model to assign a weight to each factor or feature based on its relevance to the weight prediction task. In embodiments, this is important because not all factors (like economic importance or worker turnover) will have similar impact on the demand and supply scores at all times. In examples, attention mechanism 503B thus calculates a weight (or "attention score") for each factor based on its importance to predicting the final output (the weights of the demand and supply scores). The attention scores will act as soft weights that adjust during training. The input factors are passed through an Attention Layer, where each factor gets assigned an attention score (between 0 and 1). These scores determine how much each factor contributes to the final prediction, dynamically adjusting as the model learns from the data.

For example, each of the below factors gets an attention score, and the features with higher scores will be emphasized more when computing the final prediction.

Demand Factors/Features: [Frequency of Mention, Economic Importance, Job Complexity, Industry Growth]

Supply Factors/Features: [Number of Skilled Workers, Worker Reliability, Turnover Rate, Engagement, Training Availability]

Note that in embodiments, a feedforward neural network with an attention mechanism may be used, but other neural network architectures may also be contemplated. In some embodiments, recurrent neural networks (RNNs), e.g., variants like long short-term memory (LSTMs) or gated recurrent units (GRUs), could prove beneficial if temporal dependencies or sequential patterns are significant in the data. Additionally, graph neural networks (GNNs) might be considered if relationships between different skills or industries are represented in a graph structure, allowing the model to learn from interconnected data. In embodiments, hybrid approaches, combining elements of feedforward, recurrent, and/or graph networks, can be used to leverage the strengths of each architecture.

FIG. 7 illustrates RL agent 505 of FIG. 5 in more detail, in accordance with embodiments. As touched on above, once attention mechanism 503B has assigned weight to each input feature, RL agent 505 will further adjust and improve weights for both the Demand Score (DS) and Supply Score (SS) based on feedback from how well the model's predicted weights minimize the Gap Score (GS). As briefly touched upon above, RL agent 505 operates based on the below:

State: The state is the vector of attention-weighted factors/features—this is the input data after the attention mechanism has processed it.

Action: The action is to select or predict the weights for the Demand Score and Supply Score (i.e., w1, w2, w3, w4 for demand and w5, w6, w7, w8, w9 for supply).

Reward: The reward function is designed to encourage the RL agent to select the optimal weights that minimize the Gap Score. For example, the model could receive a high reward if the Gap Score (GS) between Demand Score and Supply Score is small, and a low reward if the gap is large. The goal is for the model to learn to predict weights that reduce this gap.

Action-Value Function: The RL agent will use techniques like Q-learning to learn the value of each action (i.e., weight prediction) based on past rewards. Over time, the agent will learn to select the set of weights that leads to the best performance (minimal gap score).

RL agent 505's output may include optimized or refined demand weights 507 and optimized or refined supply weights 509. The optimized or refined demand weights 507 are used in a demand equation (e.g., 415A of FIG. 4) to generate the demand score, while the optimized/refined supply weights 509 are used in the supply equation (e.g., 415B of FIG. 4) to generate the supply score. In embodiments, process 500 is driven by RL agent 505's reward mechanism which is directed to minimize the gap between the demand score and the supply score over time. In various embodiments, refined demand weights 507 and refined supply weights 509 are fed back into the RL agent 505.

Figure 8:
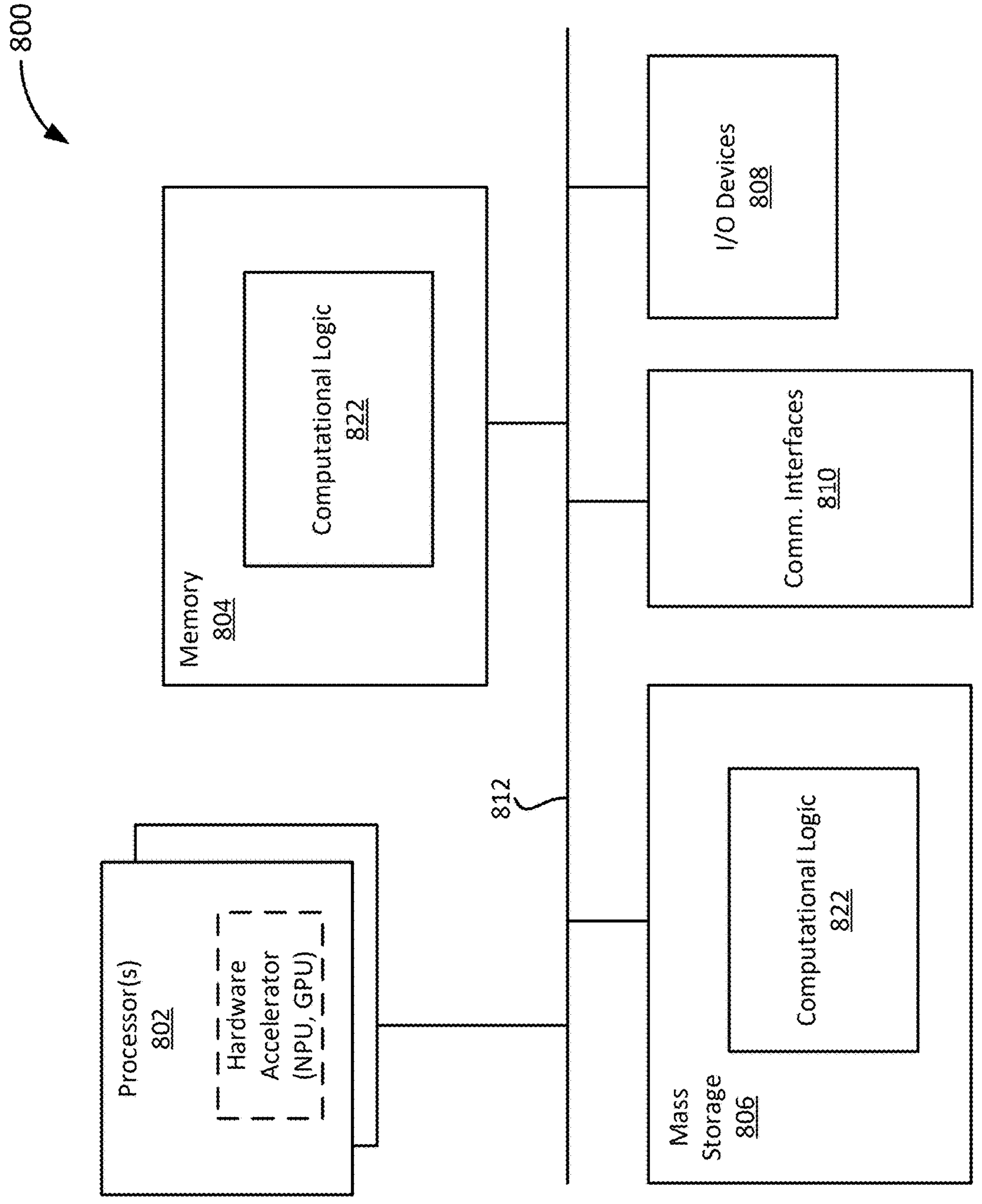
FIG. 8 is an example computing device that may assist in implementing embodiments of FIGS. 1-7, in accordance with embodiments of the disclosure.

FIG. 8 illustrates an example computing device 800 suitable for use with embodiments, such as described in connection with FIGS. 1-7. As shown, computing device 800 may include one or more processors or processor cores 802 and memory 804. In embodiments, memory 804 may be system memory. For the purpose of this application, including the claims, the terms "processor" and "processor cores" may be considered synonymous, unless the context clearly requires otherwise. The processor 802 may include any type of processors, such as a central processing unit CPU, graphics processing unit (GPU), a microprocessor, and/or specialized AI hardware accelerators, and the like. Specifically for AI workloads, processor 802 may include Neural Processing Units (NPUs) optimized for matrix operations common in neural networks or Tensor Processing Units (TPUs) designed for high-throughput, low-precision computing used in deep learning. In embodiments, the AI hardware accelerators execute the parallel computations required for training and inferencing with large language models (LLMs) and other deep learning models. Alternatively, these AI accelerators may also be implemented as discrete components coupled to the system bus 812 and not integrated with processor 802.

In such embodiments, communication interfaces 810 may provide an interface to such AI accelerators. Alternatively, computing device 800 may not include any AI accelerators, and processor 802 may be a high-performance multi-core processor configured to perform both general purpose computing and computations for performing machine learning with deep neural networks (DNNs). The processor 802 may be implemented as an integrated circuit having multi-cores, e.g., a multi-core microprocessor.

The computing device 800 may include mass storage devices 806 (such as diskette, hard drive, volatile memory (e.g., dynamic random-access memory (DRAM), High Bandwidth Memory (HBM), High Bandwidth Memory 2 (HBM 2), High Bandwidth Memory 3 (HBM 3)), compact disc read-only memory (CD-ROM), digital versatile disk (DVD), and so forth). HBM, HBM 2, and HBM 3 which may provide the high bandwidth and low latency needed to feed data to GPUs and AI accelerators quickly, preventing them from being bottlenecked by memory access during the training and inference process. In general, memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and other emerging non-volatile memory technologies suitable for storing model parameters and datasets for long periods.

As noted above, in embodiments, processor 802 is a high performance or server CPU and/or a specialized AI accelerator. In some embodiments, computational logic 822 is configured to cause a sequence of events to occur such as inferring a skill, refining weights and/or RL agent adjustment of weights. In AI specific embodiments, computational logic 822 may further include instructions, control logic, and/or circuitry to perform functions related to AI model training, inference, or deployment. This may include loading model parameters into memory, performing forward and backward passes in neural networks, managing data preprocessing and postprocessing, and implementing specific algorithms such as federated averaging for distributed learning. For LLMs, the computational logic might handle tasks like tokenization, attention mechanisms, and generating text sequences. These computations are typically performed on the specialized AI processors (NPUs, TPUs) or GPUs, leveraging their parallel processing capabilities to accelerate the underlying matrix and tensor operations.

The computing device 800 may further include input/output (I/O) devices 808 (such as a display (e.g., a touchscreen display), keyboard, cursor control, remote control, gaming controller, image capture device, and so forth) and communication interfaces 810 (such as network interface cards, modems, infrared receivers, radio receivers (e.g., Bluetooth), and so forth). The communication interfaces 810 may include communication chips that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, memory 804 and mass storage devices 806 may be employed to store a working copy and a permanent copy of the programming instructions for the operation of machine learning engines as described above. For AI, LLMs, and neural networks, these programming instructions would include the code for the specific model architecture (e.g., number of layers, types of neurons, activation functions), the optimization algorithms (e.g., variants of stochastic gradient descent), and any specialized libraries or frameworks used for development (e.g., TensorFlow, PyTorch, K eras). During execution, the model's parameters (weights and biases) may be loaded into memory (potentially high-bandwidth memory like HBM if using GPUs or AI accelerators), and the model would process input data through forward passes to make predictions. In training, backpropagation would be used to calculate gradients and update model parameters based on the loss function. The various elements may be implemented by assembler instructions supported by processor(s) 802 or high-level languages that may be compiled into such instructions.

The permanent copy of the programming instructions may be placed into mass storage devices 806 in the factory, or in the field, through, for example, a distribution medium (not shown), such as a compact disc (CD), or through communication interface 810 (from a distribution server (not shown)). That is, one or more distribution media having an implementation of the agent program may be employed to distribute the agent and to program various computing devices.

The number, capability, and/or capacity of the elements 808, 810, 812 may vary, depending on whether computing device 800 is used as a stationary computing device, such as a server computer in a data center, or a mobile computing device, such as a tablet computing device, laptop computer, game console, or smartphone. Their constitutions are otherwise known, and accordingly will not be further described.

Figure 9:
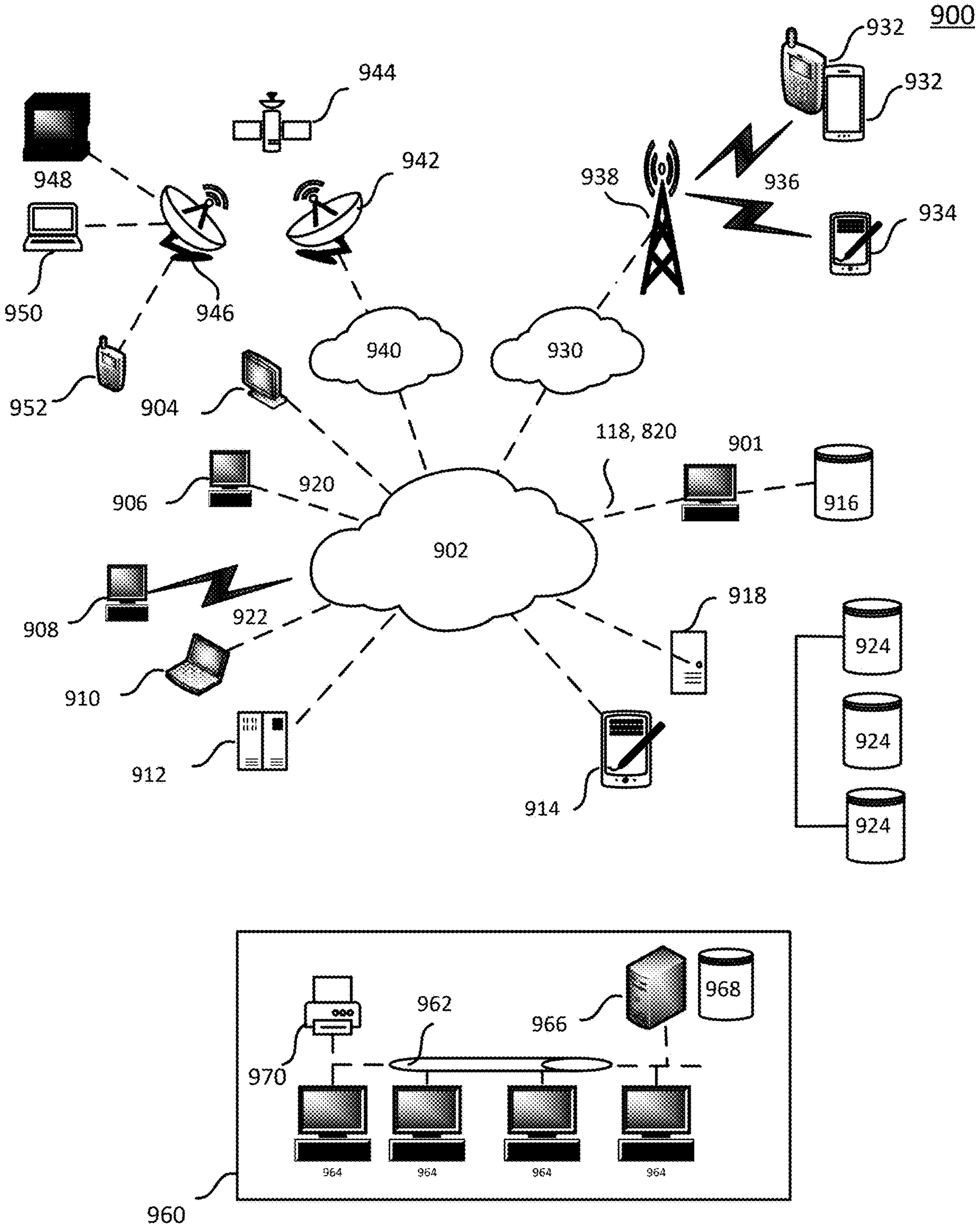
FIG. 9 is an example networked communications system which may also assist in implementing embodiments of FIGS. 1-8, in accordance with embodiments of the disclosure.

FIG. 9 illustrates a networked communications system that may be used in conjunction with FIGS. 1-8 to implement embodiments of the disclosure. FIG. 9 may include one or more computing device(s) 901. Computing device 901 could connect to network 902, for example via the Internet or a wide area network (WAN). Input data 118 and output data 820 could be communicated to other devices via network 902. Other terminals, for example, thin client 904, further processing systems 906 and 908, notebook computer 910, mainframe computer 912, PDA 914, pen-based computer 916, server 918, etc., can be connected to network 902. These devices may host or interact with AI models, including LLMs and neural networks e.g., FIGS. 1-5.

For instance, servers 918 might host cloud-based AI services, while other devices might run local AI models or participate in federated learning (e.g., of FIG. 4). A large variety of other types of terminals or configurations could be utilized. The transfer of information and/or data over network 902 can be achieved using wired communications means 920 or wireless communications means 922. Server 918 can facilitate the transfer of data between network 902 and one or more databases 924. Server 918 and one or more databases 924 provide an example of an information source. In the context of AI, these databases might store training data, model parameters, or outputs from AI models.

Other networks may communicate with network 902. For example, telecommunications network 930 could facilitate the transfer of data between network 902 and mobile or cellular telephone 932 or a PDA-type device 934, by utilizing wireless communication means 936 and receiving/transmitting station 938. Mobile telephone 932 devices may load software (client) that communicates with a backend server 906, 918 that operates a backend version of the software. This backend software could involve AI model inference or training. For example, a mobile phone 932 could send data to a server 918 for processing by an LLM, or it could participate in federated learning by sending model updates. The software client may also execute on other devices 904, 906, 908, and 910. Client users may come in multiple user classes such as worker users and/or employer users.

Satellite communications network 940 could communicate with satellite signal receiver 942 which receives data signals from satellite 944 which in turn is in remote communication with satellite signal transmitter 946. Terminals, for example further processing system 948, notebook computer 950, or satellite telephone 952, can thereby communicate with network 902. Satellite communication may be used for connecting remote devices or areas with limited terrestrial infrastructure to AI services or for enabling federated learning in geographically dispersed locations. A local network 960, which for example may be a private network, LAN, etc., may also be connected to network 902. For example, network 902 may relate to ethernet 962 which connects terminals 964, server 966 which controls the transfer of data to and/or from database 968, and printer 970. Various other types of networks could be utilized.

The processing device 900 is adapted to communicate with other terminals, for example further processing systems 906, 908, by sending and receiving data, 118, to and from the network 902, thereby facilitating possible communication with other components of the networked communications system.

Thus, for example, the networks 902, 930, 940 may form part of, or be connected to, the Internet, in which case, the terminals 906, 908, 918, for example, may be web servers, Internet terminals or the like. The networks 902, 930, 940, 960 may be or form part of other communication networks. Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G, 6G), optical communication networks, Internet Service Providers (ISPs), a peer-to-peer network, a LAN (e.g., 960), a Wide Area Network (WAN), a public network (e.g. "the Internet"), a private network, a satellite network (e.g., as shown in the Figure), or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for calculating demand scores and supply scores for workers, the method comprising:

receiving, by a computing device, input data related to factors related to worker demand and factors related to worker supply;

processing, by the computing device, the input data using a neural network, wherein the neural network comprises:

an input layer configured to receive the input data;

an attention mechanism configured to:

assign initial attention weights to each of the factors based on their relative importance in predicting worker demand and worker supply; and generate a weighted representation of the input data based on the assigned initial attention weights; and an output layer to output an initial set of demand weights for a demand equation and an initial set of supply weights for a supply equation, wherein the factors related to worker demand and worker supply are factors for demand and supply of a skill that are extracted using an ensemble of LLMs;

refining, by the computing device, the initial set of demand weights and the initial set of supply weights using a reinforcement learning (RL) agent, wherein the RL agent is configured to:

receive, as a state, the initial set of demand weights, the initial set of supply weights, and the weighted representation of the input data;

select an action to adjust the demand weights and the supply weights;

calculate a demand score and a supply score using the adjusted demand weights and adjusted supply weights in respective demand and supply equations;

calculate a gap score by subtracting the supply score from the demand score; and receive a reward based on the gap score, wherein the reward is inversely proportional to the magnitude of the gap score and wherein the RL agent is to update its policy based at least on its reward and to select adjustments to the demand weights and the supply weights to minimize the gap score over time.

2. The computer-implemented method of claim 1, wherein the demand equation is configured to calculate a demand score based on a weighted combination of the factors related to worker demand and the supply equation is configured to calculate a supply score based on a weighted combination of the factors related to worker supply.

3. The computer-implemented method of claim 1, wherein the neural network further comprises a plurality of hidden layers configured to process the weighted representation of the input data.

4. The computer-implemented method of claim 1, wherein the input data is ingested from electronic records comprising textual data derived from one or more of job orders, market research reports, or real-time feedback from worksites.

5. The computer-implemented method of claim 1, wherein the ensemble of LLMs comprises a first large language model configured to perform syntactic parsing and a second large language model configured to perform semantic understanding, and wherein the skill is extracted by aggregating independent confidence scores generated by the first and second large language models.

6. A system, comprising:

one or more memories storing instructions; and one or more processors operatively coupled to the one or more memories to access the memories and configured to:

cause input data including factors related to worker demand and factors related to worker supply for a skill to be processed using a neural network, wherein the neural network comprises:

an input layer configured to receive the input data;

an attention mechanism configured to:

assign initial attention weights to each of the factors based on their relative importance in predicting worker demand and worker supply; and generate a weighted representation of the input data based on the assigned initial attention weights; and an output layer to output an initial set of demand weights for a demand equation and an initial set of supply weights for a supply equation, wherein the factors related to worker demand and worker supply are factors for demand and supply of a skill that are extracted using an ensemble of LLMs;

wherein the system is further to cause the initial set of demand weights and the initial set of supply weights to be refined using a reinforcement learning (RL) agent to:

receive, as a state, the initial set of demand weights, the initial set of supply weights, and the weighted representation of the input data;

select an action to adjust the demand weights and the supply weights;

calculate a demand score and a supply score using the adjusted demand weights and adjusted supply weights in respective demand and supply equations;

calculate a gap score by subtracting be supply score from the demand score; and receive a reward based on the gap score, wherein the reward is inversely proportional to the magnitude of the gap score, wherein the RL agent is to update its policy based at least on its reward and to select adjustments to the demand weights and the supply weights to minimize the gap score over time.

7. The system of claim 6, wherein the neural network further comprises a plurality of hidden layers configured to process the weighted representation of the input data.

8. The system of claim 6 wherein the system is coupled to remotely located LLMs.

9. The system of claim 6, wherein the factors related to worker demand comprise a job order complexity metric and an industry growth rate, and wherein the factors related to worker supply comprise a worker reliability score and a worker turnover rate.

10. The system of claim 6, wherein the reinforcement learning agent updates its policy to minimize the gap score based on real-time continuous feedback data received from worksites.

11. A non-transitory computer-readable storage medium comprising instructions that, when executed by one or more processors of a computing device, cause the computing device to perform operations, comprising:

receiving input data related to factors related to worker demand and factors related to worker supply;

processing, by the computing device, the input data using a neural network, wherein the neural network comprises:

an input layer configured to receive the input data;

an attention mechanism configured to:

assign initial attention weights to each of the factors based on their relative importance in predicting worker demand and worker supply; and generate a weighted representation of the input data based on the assigned initial attention weights; and an output layer to output an initial set of demand weights for a demand equation and an initial set of supply weights for a supply equation, wherein the factors related to worker demand and worker supply are factors for demand and supply of a skill that are extracted using an ensemble of LLMs;

refining the initial set of demand weights and the initial set of supply weights using a reinforcement learning (RL) agent, wherein the RL agent is configured to:

receive, as a state, the initial set of demand weights, the initial set of supply weights, and the weighted representation of the input data;

select an action to adjust the demand weights and the supply weights;

calculate a demand score and a supply score using the adjusted demand weights and adjusted supply weights in respective demand and supply equations;

calculate a gap score by subtracting the supply score from the demand score; and receive a reward based on the gap score, wherein the reward is inversely proportional to the magnitude of the gap score, wherein the RL agent is to update its policy based at least on its reward and to select adjustments to the demand weights and the supply weights to minimize the gap score over time.

12. The non-transitory computer-readable storage medium of claim 11, wherein the ensemble of LLMs comprises a first large language model configured to perform syntactic parsing and a second large language model configured to perform semantic understanding, and wherein the operations further comprise extracting the skill by aggregating independent confidence scores generated by the first and second large language models.

13. The non-transitory computer-readable storage medium of claim 11, wherein the factors related to worker demand comprise a job order complexity metric and an industry growth rate, and wherein the factors related to worker supply comprise a worker reliability score and a worker turnover rate.

14. The non-transitory computer-readable storage medium of claim 11, wherein the reinforcement learning agent updates its policy to minimize the gap score based on real-time continuous feedback data received from worksites.

15. The non-transitory computer-readable storage medium of claim 11, wherein the ensemble of LLMs includes a model that is fine-tuned for a staffing industry.

* * * * *